Dec. 19, 1967  J. R. ANDERSEN  3,359,047
BEARING STRUCTURE

Filed May 28, 1965  2 Sheets-Sheet 1

INVENTOR
J. R. ANDERSEN
BY
Stoddard
ATTORNEY

Dec. 19, 1967    J. R. ANDERSEN    3,359,047
BEARING STRUCTURE
Filed May 28, 1965    2 Sheets-Sheet 2

United States Patent Office 3,359,047
Patented Dec. 19, 1967

3,359,047
BEARING STRUCTURE
Johan R. Andersen, Bloomingdale, N.J., assignor to Bell Telephone Laboratories, Incorporated, New York, N.Y., a corporation of New York
Filed May 28, 1965, Ser. No. 459,835
1 Claim. (Cl. 308—36)

ABSTRACT OF THE DISCLOSURE

An improved bearing structure comprising a backing member and a lining member having different coefficients of expansion is constructed in accordance with a particular novel geometry for compensating for their different amounts of expansion during various ranges of temperature.

This invention relates to bearings and, more particularly, to bearings having improved linings for forming the actual bearing surfaces. The invention is especially useful when it is applied to bearings and linings of dissimilar metals which are required to have a precise fit throughout a wide range of temperature variations. From this standpoint, the invention may be considered as relating to a bearing support structure having a lining which is fabricated in such a manner as to compensate for the difference between the respective thermal expansion coefficients of the bearing structure and its lining.

In mechanical assemblies, it is frequently necessary to fit a shaft closely into a lining member which, in turn, is fitted into a bearing structure. In certain installations, the lining is made of steel while the bearing structure is made of another metal, such as magnesium or aluminum, having a different coefficient of expansion. When such an assembly is exposed to large temperature variations, the resulting different amounts of expansion and contraction caused by using metals having different coefficients of expansion present serious problems. If the fit between the lining and the bearing structure is made close at room temperature, the fit may become loose in the higher range of operating temperatures. During the lower range of operating temperatures, the fit may become too tight and may produce stresses in the various materials.

Accordingly, it is an object of this invention to provide an improved lining for a bearing structure.

Another object of the invention is to provide thermal expansion compensation means for the lining of a bearing structure.

It is also an object of the invention to provide a lining of improved geometrical design for a bearing structure.

These and other objects of the invention are attained, in a bearing structure having a backing member of metallic composition and a lining member of a different metallic composition, by constructing the lining member in such a manner as to maintain the original interfacial fit between the lining member and the backing member regardless of differences in the expansion and contraction of these members when subjected to changes in their environmental temperature. The lining member is fabricated in the form of a hollow steel cylinder adapted to receive therein a work-shaft made of the same material. At each end of the cylinder, the outer surface is provided with a projecting flange. These flanges are so shaped as to constitute the frustums of imaginary coaxial cones having equal apical angles whose vertices coincide at a common point on the axis of the cylinder.

The backing member, which is made of aluminum, has a hole or bore slightly larger than the cylinder so as to provide an interfacial fit having a slight clearance between the backing member and the lining member. The bore in the backing member is provided with enlargements at its opposite ends shaped to conform precisely to the surfaces of the flanges. Thus, when the lining member is inserted in the bore of the backing member, the only contact between the two members is on their opposed complementary conical surfaces and there is a slight clearance between their intermediate portions. The interfacial fit will be maintained throughout various expansions and contractions of the backing and lining members because they will simply slide along their conical interfacial surfaces in a manner that is fully explained hereinafter.

These and other features of the invention are more fully discussed in connection with the following detailed description of the drawing in which.

Figure 1:
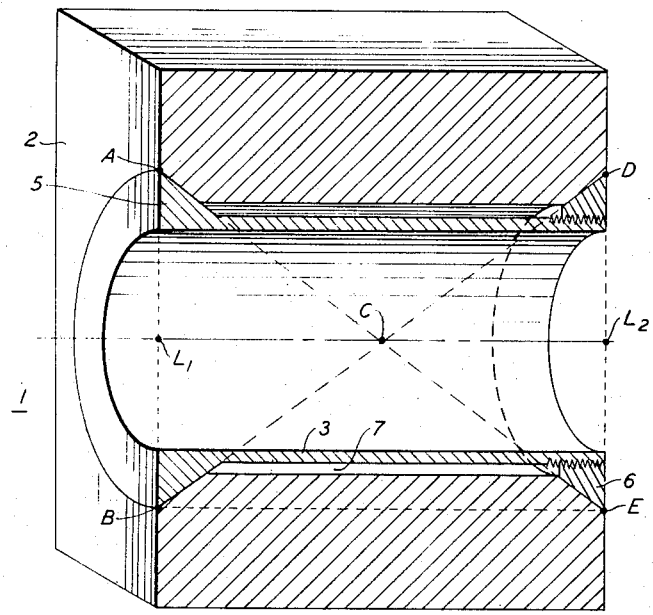
FIG. 1 is a perspective view of a cross-section of a bearing structure having an improved lining in accordance with this invention.
Figure 3:
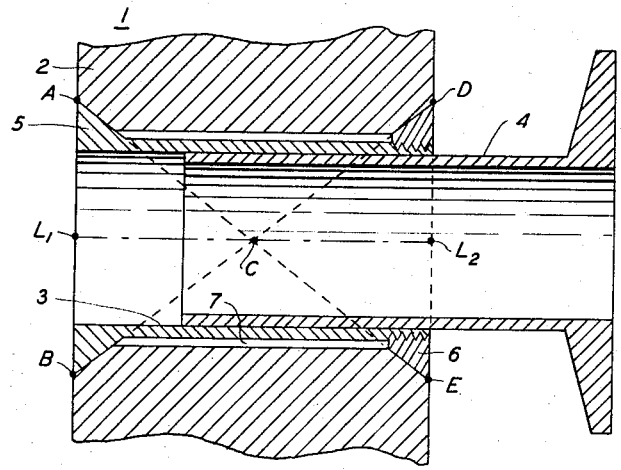
FIG. 3 is a cross-sectional view of the bearing structure of FIG. 1 with a work-shaft inserted therein.

In the exemplary embodiment of the invention that is shown in FIGS. 1 and 3, a bearing structure 1 is represented as comprising a supporting structure, or backing member 2 and a lining member 3. In this specific representation, the backing member 2 is made of a suitable light material, such as aluminum. The lining member 3 is made of a suitable strong material, such as steel. Due to this difference in their metallic compositions, the backing member 2 has a thermal expansion coefficient which is different from that of the lining member 3.

The steel lining member 3 has its body or main portion made in the form of a hollow cylinder which is adapted to receive therein a work-shaft 4 of the same material. This work-shaft 4 is represented in FIG. 3 as being in the form of a telescoping steel plunger which fits closely inside the lining member 3. One end of the lining member 3 has a projecting flange 5 formed integrally therewith. The other end of the lining member 3 is threaded for receiving thereon a removable flange 6 in the manner of a nut. The flanges 5 and 6 have circular bases and are similarly shaped in accordance with a particular geometrical design.

Specifically, the flanges 5 and 6 are formed in such a manner that their external surfaces constitute the frustums of imaginary coaxial cones having equal apical angles whose vertices coincide at a common point on the axis of the cylindrical lining member 3. In other words, the apical angle ACB is equal to the apical angle DCE and their vertices coincides at the point C which lies on the axis $L_1L_2$ of the cylindrical lining member 3. Therefore, the triangles ACB and DCE are similar triangles. In this embodiment of the invention, the point C is the midpoint of the line $L_1L_2$ and the triangles ACB and DCE are equal.

The bearing support structure or backing member 2 has a hole or bore which is slightly larger than the outside diameter of the cylindrical portion of the lining member 3 so as to provide an interfacial fit having a slight clearance 7. Each end of the bore in the backing member 2 is provided with enlargements that have a spacing between them which is the same as the spacing between the flanges 5 and 6. These enlargements are shaped to conform precisely to the surfaces of the flanges 5 and 6 which fit closely therein. In other words, the surfaces of the enlargements are complementary to the conical surfaces of the flanges 5 and 6. Due to this geometrical design, the only contact between the backing member 2 and the lining member 3 is on their opposed complementary conical surfaces.

When the lining member 3 and its flanges 5 and 6 are initially inserted in the hole or bore of the backing member 2, the flange 6 is tightened, or preloaded, with a slight pressure so as to maintain a tight interfacial fit between the flanges 5 and 6 and the corresponding surfaces of the enlargements in the bore of the backing member 2. The geometrical design of the parts functions to preserve their original preloaded contact pressure and to maintain it during various expansions and contractions of the backing member 2 and the lining member 3. Therefore, no loosening of the parts will occur during high operating temperatures and no additional stresses will occur during low operating temperatures. Thus, the original assembly stresses will remain the same throughout the entire range of the operating temperatures.

The manner in which the original preloaded contact pressure between the parts is maintained will now be explained with reference to FIG. 2 which is an enlarged cross-sectional view of the lower left portion of the bearing structure 1 shown in FIG. 1. The essential principle is that, during expansion and contraction movements, each point on the opposed complementary conical surfaces moves in such a manner that its different positions form a straight line which corresponds to the slope of the apical angles ACB and DCE. In other words, these points move, in effect, by sliding along one of the conical interfaces between the backing member 2 and the lining member 3 and the slopes of their paths of movement are the same regardless of whether the points are on the flanges 5 and 6 or on the enlargements in the bore in the backing member 2.

Figure 2:
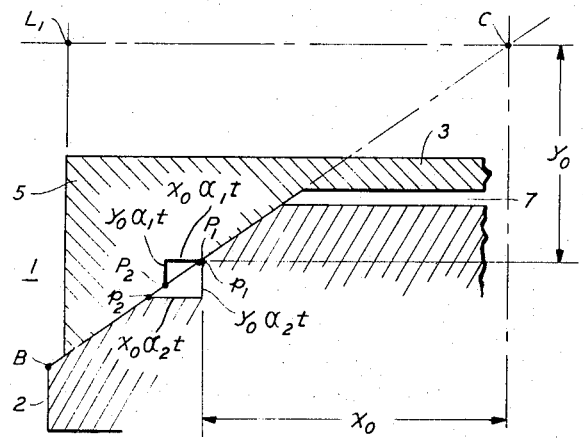
FIG. 2 is a cross-sectional view of a portion of the bearing structure of FIG. 1 shown on an enlarged scale with notations which explain the sliding movement of points on the opposed complementary conical surfaces of the backing member and the lining member.

It can be understood that, on the basis of the above discussion, the line $L_1C$ in FIG. 2 is a portion of the axis of the cylindrical bore in the lining member 3 and the line BC is a straight line representing the slope of the apical angle ACB. Let it be assumed that a point $P_1$ on the surface of the steel flange 5 is initially adjacent to a point $p_1$ on the conical surface of the aluminum backing member 2. As these points are adjacent to each other, they have the same coordinates; namely, $x_0$ and $y_0$ and their slope is the tangent of angle $L_1CB$ or $y_0/x_0$.

Now, let it be assumed that a rise in temperature causes expansion of the metallic components. Since the backing member 2 and the lining member 3 have different coefficients of expansion, the points $P_1$ and $p_1$, will move at different rates and will not now be adjacent to each other. Instead, the point $P_1$ will be at a new location $P_2$ and the point $p_1$ will be at $p_2$.

Each of the new coordinates of the point $P_2$ can be determined by multiplying the original coordinates by $(1+\alpha_1 t)$ where $\alpha_1$ is the coefficient of expansion for steel and $t$ is the period of time that is involved. Thus, the coordinates of the point $P_2$ are $x_0+x_0\alpha_1 t$ and $y_0+y_0\alpha_1 t$. Similarly, the coordinates of the point $p_2$ are $x_0+x_0\alpha_2 t$ and $y_0+y_0\alpha_2 t$, where $\alpha_2$ is the coefficient of expansion for aluminum and $t$ is the same period of time as for the point $P_2$.

Accordingly, the slope of the line $P_1P_2$ can be expressed as $y_0\alpha_1 t/x_0\alpha_1 t$ which, when simplified, becomes $y_0/x_0$. Similarly, the slope of the line $p_1p_2$ is $y_0\alpha_2 t/x_0\alpha_2 t$ or $y_0/x_0$. Thus, the slope of the path of movement of the point $P_1$ is equal to the slope of the path of movement of the point $p_1$. Since the points $P_1$ and $p_1$ move along paths having the same slope, it necessarily follows that the original contact pressure between the lining member 3 and the backing member 2 will be maintained throughout all changes in temperature.

In view of the above discussion, the geometrical design of the flanges 5 and 6 may be defined in terms of the triangle ABE, shown in FIG. 1, wherein the tangent of angle BAE is $BE/BA$. Therefore, the slope of the conical surfaces can be expressed, in this embodiment of the invention, as the ratio of the length of the lining member 3 divided by the outer diameter of the base of its flange 5.

Figure 4:
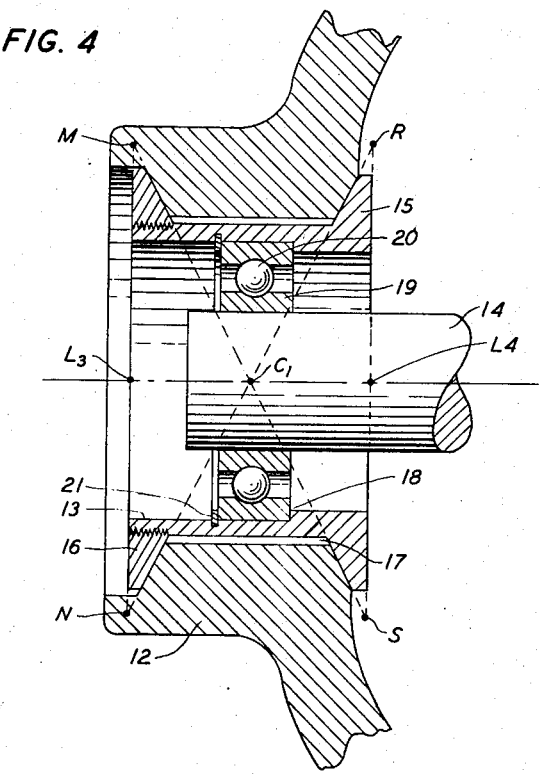
FIG. 4 is a cross-sectional view of a different form of the improved bearing having a work shaft supported therein on an intermediate or auxiliary bearing structure.

This improved bearing structure is not limited to the specific type of use illustrated in FIG. 3 but may be applied to various other types of use. For example, it may be employed in co-operation with an auxiliary bearing structure. A use of this latter type is represented in FIG. 4 which shows a differently shaped aluminum supporting or backing member 12 and a somewhat different steel lining member 13. The bore of the lining member 13 is formed with a shoulder 18 therein for supporting a steel race 19 containing steel ball bearings 20. The race 19 is held against the shoulder 18 by a conventional retaining ring 21 which fits into a circular slot or groove in the wall of the bore in the lining member 13. The steel race 19 functions as an intermediate or auxiliary bearing structure for supporting a work-shaft 14 of the same material.

The lining member 13 is formed with an integral flange 15 at one end and, at its other end, is provided with a flange 16 which is removable in the manner of a nut. The flange 16 is initially tightened to supply a preloaded contact pressure corresponding to that mentioned above. The flanges 15 and 16 are formed in the shape of frustums of coaxial cones having equal apical angles whose vertices coincide at a common point $C_1$ on the axis $L_3L_4$ of the cylindrical lining member 13. It should be noted that, in this embodiment of the invention, the point $C_1$ is not necessarily the mid-point of the line $L_3L_4$ because the actual altitude of the removable flange 16 may be different from the altitude of the integral flange 15.

The backing member 12 has a hole or bore therein for receiving the lining member 13. This bore is slightly larger than the lining member 13 so as to provide a clearance 17 between them. Each end of this bore is provided with enlargements which are shaped to conform to the flanges 15 and 16.

Accordingly, the flanges 15 and 16 together with the enlargements in the backing member 12 are shaped in accordance with the above-mentioned improved geometrical design wherein the triangle $MC_1N$ is similar to the triangle $RC_1S$ and their apices coincide at the common point $C_1$ lying on the axis of the cylindrical bore in the lining member 13. Therefore, the preloaded contact pressure between the flanges 15 and 16 and the enlargements in the backing member 12 will be maintained throughout various expansions and contractions of the backing member 12 and the lining member 13. Since the original interfacial fit between the bearing support structure 12 and the lining member 13 is thus maintained constant, environmental temperature variations will not impose any additional stresses upon the race 19 and its ball bearings 20.

What is claimed is:

A thermal expansion compensation bearing adapted to be subjected to temperature variations, said bearing comprising a lining member and a backing member each having respectively different coefficients of expansion, said lining member including a body portion having a cylindrical hole of uniform diameter therethrough and of the same length as the outside length of said body portion and adapted for supporting a workpiece therein, said body portion having an intermediate portion of uniform outside diameter;

said backing member having means defining a bore which has a length that is the same as the length of said lining member and which is adapted to receive therein said body portion, and thermal expansion compensation means for compensating for the difference between the respective thermal expansion coefficients of said lining member and said backing member, said thermal compensation means including a bulging portion at each end of said body portion of said lining member and of greater diameter than said diameter of said intermediate portion, each of said bulging portions having an annular cross-section with an inner diameter equal to that of said hole in said lining member and an outer diameter greater than that of said intermediate portion, each of said bulging portions having an outer diameter which is at a maximum at the respectively associated end of said body portion and which progressively diminishes in a direction toward said intermediate portion for forming a declining contour having a slope which is the ratio of the length of said lining member divided by the length of one of said maximum diameters, said bore in said backing member having an intermediate portion of uniform diameter slightly in excess of said uniform diameter of said hole in said lining member, said bore having end portions of greater diameter than said uniform diameter of said intermediate portion of said bore, each of said end portions of said bore having a diameter which is at a maximum at the respectively associated end of said bore and which progressively diminishes in a direction toward said intermediate portion of said bore at a rate determined by said slope ratio of said bulging portions, and said maximum diameter of each of said end portions of said bore being equal to said maximum diameter of each of said bulging portions.

References Cited
UNITED STATES PATENTS

| | | |
|---|---|---|
| 2,266,320 | 12/1941 | Hobbs. |
| 2,586,099 | 2/1952 | Schultz. |
| 2,590,761 | 3/1952 | Edgar. |
| 2,965,419 | 12/1960 | Brownback. |
| 3,145,362 | 8/1964 | Kleven. |
| 3,266,006 | 8/1966 | Abbott _____ 308—189 X |

MARTIN P. SCHWADRON, *Primary Examiner.*

BENJAMIN A. BORCHELT, FRANK SUSKO,
*Examiners.*

W. ROCH, *Assistant Examiner.*